United States Patent Office 3,073,754
Patented Jan. 15, 1963

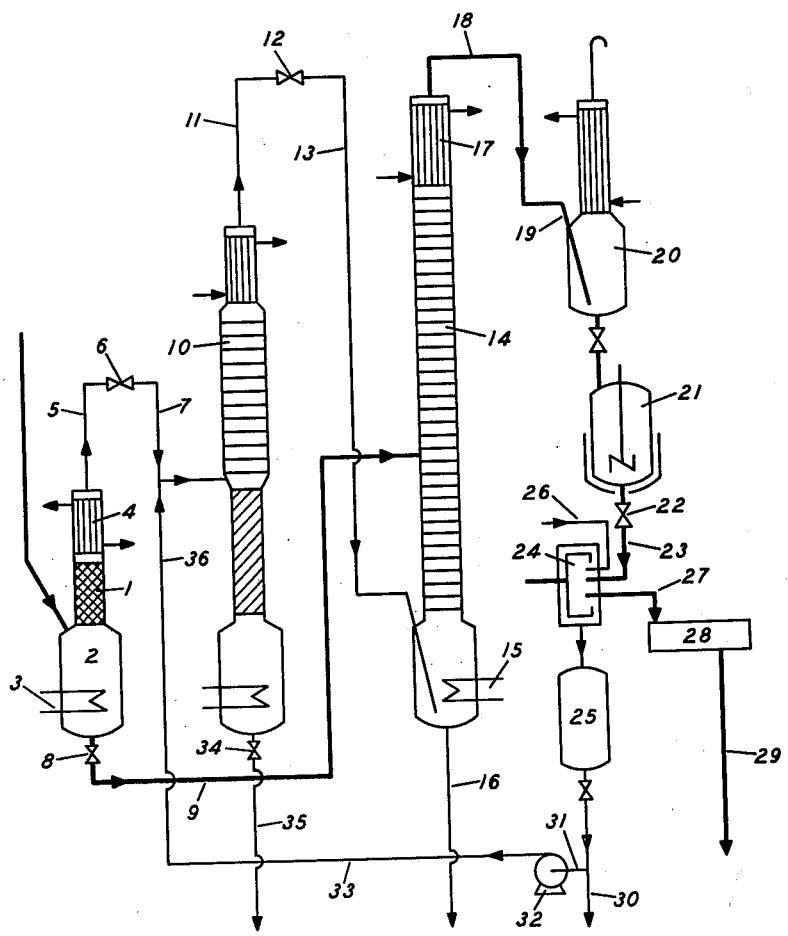

3,073,754
PROCESS FOR THE PURIFICATION OF CRUDE DIMETHYL TEREPHTHALATE
Harry James Aroyan, San Rafael, Calif., and Richard Sinn, Karl Scherf, and Ludwig Vogel, Ludwigshafen (Rhine), Germany, assignors to California Research Corporation, San Francisco, Calif.
Filed Jan. 21, 1960, Ser. No. 3,833
Claims priority, application Germany Jan. 24, 1959
9 Claims. (Cl. 202—51)

This invention relates to an improved process for the purification of dimethyl terephthalate. In particular, the invention relates to an improvement in the recovery of pure dimethyl terephthalate from mixtures which contain dimethyl terephthalate, impurities, methanol and water.

It is known that crude dimethyl terephthalate can be purified by recrystallization from organic solvents, such as alcohols, acetone and hydrocarbons, or by extraction or distillation under reduced pressure. It is also known to purify crude dialkyl terephthalates, such as dimethyl terephthalate, by carrying out a carrier vapor distillation using organic solvents, such as methanol, hydrocarbons or acetone, as carrier vapors, with subsequent condensation of the vapor mixture and separating the pure dialkyl terephthalate, which crystallizes out, from the mother liquor.

It has been found however that as a rule it is necessary to carry out several of the said purification processes in order to purify the dialkyl terephthalates to the extent necessary for its further processing to spinning material. Carrying out several successive purification processes not only requires considerable expenditure of time and apparatus but also has the disadvantage that it is attended by considerable waste of dimethyl terephthalate and solvent.

It is an object of the present invention to provide an improved process for the purification of crude dimethyl terephthalate in which the above-mentioned disadvantages do not occur and pure ester, which can be worked up to spinning material, is directly obtained in a single continuous working operation.

Another object of the invention is to provide a process for the purification of dimethyl terephthalate which operates economically, can readily be carried out industrially and in which no appreciable loss of the ester occurs.

Yet another object of the invention is the recovery of pure dimethyl terephthalate from mixtures which contain besides the crude ester, also methanol and water, in a continuous process, in which the working up of the mixture and the separation of the impurities from dimethyl terephthalate take place in apparatus connected with each other.

These and other objects and advantages of the invention will hereinafter be described in greater detail and in conjunction with the accompanying drawing which illustrates diagrammatically an especially preferred embodiment of the invention.

We have found that the objects of our invention are achieved and especially pure dimethyl terephthalate is obtained when crude dimethyl terephthalate which contains aqueous methanol, i.e., a mixture of crude dimethyl terephthalate, methanol, water and impurities, is introduced into a distillation column which is maintained at a pressure at which the condensation temperature of the vaporized methanol-water mixture lies above the solidification temperature of the dimethyl ester, a vapor mixture consisting of methanol, water and impurities of lower boiling point than dimethyl terephthalate is withdrawn from the column as a fraction from the top and from the bottom of the column a crude ester is allowed to flow away which contains higher boiling impurities and possibly solid particles, the fraction distilling off at the top is introduced into a dehydrating distillation column which operates under conditions at which pure methanol distills off at the top of the column and water with the impurities boiling lower than the ester are obtained as the bottoms, the crude ester flowing away from the first distillation column is introduced into a second distillation column which is kept substantially at atmospheric pressure, into the bottom of this second distillation column there is led the pure methanol vapor which is withdrawn from the top of the dehydration column, the ester-methanol vapor mixture which distills over is condensed, the ester is separated from the liquid methanol in the condensate and the pure dimethyl terephthalate is recovered.

As initial material there are suitable mixtures of crude technical dimethyl terephthalate which contain methanol and water. The water content in such initial mixtures should however preferably not be too high in relation to the amount of methanol and the weight of the water should not if possible exceed that of methanol; it is advantageous for the water content of the initial mixture to be between about 1% and 30% by weight with reference to the methanol.

It is immaterial for carrying out the process according to this invention in what way the dimethyl terephthalate contained in the initial mixture has been obtained or what impurities adhere thereto. Any contaminated crude dimethyl terephthalate can be used. For the production of the dimethyl terephthalate it is possible for example to start from crude technical terephthalic acid which has been obtained by air oxidation or nitric acid oxidation of benzene hydrocarbons with two oxidizable side chains or from partly oxidized derivatives of these benzene hydrocarbons, one of the side chains if desired being a free or esterified carboxyl group, possibly with the co-employment of catalysts.

The nature and amount of the impurities which adhere to the dimethyl terephthalate serving as initial material for the purification process according to the invention are obviously dependent on the initial materials and the methods from and by which the terephthalic ester has been prepared. Apart from certain impurities of which the constitution is not yet known, the chief and most important impurities of known constitution are for example para-toluic acid methyl ester, terephthalaldehydic acid methyl ester, para-toluic aldehyde, nitroterephthalic acid methyl ester, terephthalic acid monomethyl ester, hydroxyterephthalic acid ester and aminoterephthalic acid ester.

For the purposes of the process according to the present invention, the methanol content of the initial mixtures containing dimethyl terephthalate may vary within wide limits. It is advantageous to start from mixtures which contain about 1.5 to 8 parts by weight of methanol for each part by weight of dimethyl terephthalate.

The process is especially suitable for the production of pure dimethyl terephthalate from esterification mixtures such as are obtained directly in the esterification of crude technical terephthalic acid with methanol at a weight ratio usually of 1:2 to 1:5 at elevated temperatures, for example about 150° to 350° C., and high pressures of about 10 to 700 atmospheres, possibly with the co-employment of esterification catalysts, such as sulfuric acid, phosphoric acid, toluene-sulfonic acid, or zinc oxide, zinc acetate or lead acetate.

There will now be described by way of example a preferred embodiment of the invention as represented by the flowsheet given in the accompanying drawing.

The initial mixture, for example an esterification mixture which has been obtained from crude terephthalic acid (obtained by nitric acid oxidation of xylene or another dialkylbenzene) and methanol by esterification, for example in a worm, at 270° C. and a pressure of 200 atmospheres in the presence of zinc acetate as esterification catalyst, is decompressed, after leaving the esterification worm, by means of a valve to a pressure of not less than 8 atmospheres absolute and, after heating up, for example after passage through a heater, introduced at about 140° to 250° C. into a distillation column. The distillation column 1 operates under a pressure at which the condensation temperature of the mixture of methanol and steam lies above the solidification temperature of the ester, i.e., above 141° C. The pressure in the column must therefore be at least 8 atmospheres absolute. It is advantageous to work at pressures of about 9 to 20 atmospheres absolute. The extent to which the esterification mixture is decompressed depends on the working pressure in the distillation column 1. It is advantageous to decompress down to the working pressure of the distillation column. Otherwise it is necessary to force the initial mixture into the column through a vaporizer and superheater, for example with a pump, against the working pressure prevailing in the distillation column. The still 2 of column 1 is preferably supplied with further heat by means of a heater 3 in order that the reflux flowing down in the column may be vaporized again. Part of the ascending vapor mixture is condensed in the condenser 4 and flows back in the column as a reflux. Boiling water under increased pressure may be used for example as the cooling medium for the condenser 4.

From the top of the column there is withdrawn through a pipe 5 a mixture of methanol, water and impurities boiling lower than dimethyl terephthalate. The crude ester together with impurities having a higher boiling point than the ester and possibly with suspended solids, as for example catalyst components, flow from the sump of the column as bottoms through a valve 8 in a pipe 9.

The separation of the methanol, water and impurities boiling lower than the ester in the distillation column 1 may also be effected in stages, for example by using two separate distillation columns instead of the distillation column 1, the working pressure in the first column being so high that the condensation temperature of the methanol-steam mixture lies above the solidification temperature of the ester, and the following column being worked at a pressure equal to or slightly less than that in the preceding stage and by no means less than about 4 atmospheres. There is then withdrawn as a top fraction from the first column a methanol-steam mixture which is introduced into the sump of the other distillation column. The bottoms from the first column, which when working in this way contain the crude ester and all the impurities, are introduced into the additional column in which the separation of the impurities boiling lower than the ester then takes place according to the principle of a carrier vapor distillation.

There then escapes from the top of this additional column a vapor mixture of methanol, water and impurities which are more readily volatile, i.e., have a lower boiling point, than the ester, while there is obtained as bottoms liquid crude ester contaminated with impurities which boil higher than the ester and possibly suspended solids.

The vaporous top fraction consisting of methanol, water and impurities boiling lower than dimethyl terephthalate, which is withdrawn through the pipie 5, is led through valve 6 and pipe 7 into a distillation column 10 in which dehydration of the mixture takes place. The dehydration in the column 10 may be carried out at atmospheric pressure or at increased pressure, for example up to a pressure which corresponds to the pressure maintained in the first distillation column. As top product there is withdrawn pure methanol through a pipe 11, while water and impurities are allowed to drain off as bottoms through valve 34 and pipe 35.

The crude ester from the distillation column 1 is passed in liquid phase through valve 8 and pipe 9 into a second distillation column 14. At the same time there is led into the still of this column through valve 12 and pipe 13 methanol vapor recovered in the dehydration column. The methanol carrier distillation in the column 14 takes place at atmospheric pressure or slightly elevated pressure, for example 0.5 atmosphere gage (=1.5 atmospheres absolute), and a still temperature which is sufficient to saturate the carrier vapor with the desired amount of ester (i.e., with the amount of ester withdrawn at the top and the amount which refluxes) and which also is sufficient further to heat up the methanol vapor introduced, for example to about 180° to 250° C., if no provision has been made to use for this purpose a separate superheater interposed in the pipe 13, and to vaporize again the reflux flowing back from the column into the sump.

Impurities which become enriched in the sump and which are of higher boiling point than dimethylterephthalate and also ester contained in the sump are periodically discharged through pipe 16. From the vapor ascending in column 14 there there is condensed out in condenser 17 at the upper end of the column, to maintain a satisfactory ester reflux, a part of the ester, which may be for example twice as large as the amount withdrawn at the top. From the top of the column 14 there is distilled a fraction which consists of pure ester and methanol. This fraction is withdrawn through pipe 18 and condensed at atmospheric or reduced pressure, for example at a pressure down to about 100 mm. Hg. The condensation may be carried out for example by leading the distillate into a condensation vessel 20 through pipe 18 and inlet pipe 19.

The condensate together with any dimethyl terephthalate which has already crystallized out is then cooled further, preferably in a container 21 and preferably while stirring, for example to temperatures between about +40° and −10° C. The separation of the pure crystalline dimethyl terephthalate from the liquid methanol may be effected by a method known per se, for example by filtering off or by centrifuging. According to the flow sheet shown in the drawing, the suspension withdrawn from the stirring container 21 through valve 22 and pipe 23 flows into a centrifuge 24 from which the recovered methanol flows back into a reservoir 25.

The dimethyl terephthalate filtered off can be washed with pure methanol introduced through pipe 26 and then passed from the centrifuge through pipe 27 into a drier 28 from which it is withdrawn through a pipe 29.

The recovered methanol can be withdrawn from the reservoir 25 through a pipe 30 and supplied for further use, for example esterification of terephthalic acid, while a part can be led through a branch pipe 31, pump 32, pipes 33 and 36 and supply pipe 7 into a dehydration column 10.

Although the invention has been described mainly with reference to one preferred embodiment, it is understood that it can be carried out with various modifications of the method described without departing from the scope of the invention. The above description is not intended to be limitative.

The following example will further illustrate this invention with reference to the accompanying drawing but the invention is not restricted to this example.

*Example*

An esterification mixture consisting of 233 kilograms of methanol, 22 kilograms of water and 109 kilograms of contaminated and crude dimethyl terephthalate is introduced per hour into column 1. Column 1 works under a pressure of 13 atmospheres absolute. At the top of the column there are withdrawn per hour in vapor form 233 kilograms of methanol, 22 kilograms of water and 3.5 kilograms of impurities boiling at a lower temperature than the ester. The temperature at the top of the column is 152° C. A ratio of distillate to reflux of 1:0.2 is set up in the column by vapor cooling in condenser 4. The vapor mixture leaving the condenser 4 is led through pipe 5, valve 6 and pipe 7 to column 10. In the column 10, which is a packed column of a height of 8 meters, the methanol is separated from the water and low boiling impurities at a pressure of 11 atmospheres absolute. The water and impurities collect in the sump of the column. 22 kilograms of water and 3.5 kilograms of impurities are drained off hourly through valve 34 and pipe 35. At the top of the column 10, 350 kilograms of methanol per hour are condensed as a reflux and 233 kilograms of methanol vapor are withdrawn through pipe 11. The vapor is decompressed to a pressure of 1.2 atmospheres absolute by means of valve 12 and led through pipe 13 into the sump of the column 14. The crude ester freed from lower boiling constituents collecting in the body 2 of the column 1 and flowing at the rate of 105.8 kilograms per hour through valve 8 and pipe 9, is introduced into the lower third of the column 14. The column 14 contains thirty trays. The temperature in the sump of the column is maintained at 210° C. and at the exit of the vapor at the top at 185° C. A reflux ratio of about 1:1 for the liquid ester is set up by the cooler 17. 2.8 kilograms per hour of high boiling impurities are withdrawn from the still of column 14 through pipe 16. The vapor mixture from the top of column 14, consisting of 102.7 kilograms of ester and 233 kilograms of methanol, flows through pipe 18 and inlet pipe 19 into the condensation vessel 20 where it is condensed by leading in liquid methanol at normal pressure. The bulk of the ester is thus separated in finely crystalline form. The suspension flows into the stirring container 21 in which the ester-methanol suspension is cooled to 20° C. From the container 21, the suspension flows through valve 22 and pipe 23 into the centrifuge 24. The pure dimethyl terephthalate is separated from the mother liquor in the centrifuge and washed with 40 kilograms of pure methanol added through pipe 26. The filtrate and washing methanol flow into the reservoir 25. The pure dimethyl terephthalate falls through pipe 27 into the drier 28 where it is freed from adherent methanol. 100 kilograms of dimethyl terephthalate with a reesterification color number of 0 to 5 hazes are obtained per hour and are withdrawn through pipe 29.

We claim:

1. Process for the purification of crude dimethyl terephthalate which comprises introducing a crude dimethyl terephthalate product containing dimethyl terephthalate, water, methanol and impurities which boil higher and lower than dimethyl terephthalate into a distillation column maintained at a pressure at which the consensation temperature of the vaporized methanol-water mixture is above the solidification temperature of dimethyl terephthalate, withdrawing a vapor mixture consisting essentially of methanol, water and impurities which boil lower than dimethyl terephthalate from the top of the column and a crude ester mixture consisting essentially of dimethyl terephthalate and impurities which boil higher than dimethyl terephthalate from the bottom of the column, introducing the fraction distilled off at the top into a dehydrating distillation column operated under conditions whereby substantially pure methanol is withdrawn overhead and water together with the impurities boiling lower than the ester is withdrawn as a bottom product, introducing the crude ester mixture from the bottom of said first distillation column into a second distillation column maintained at substantially atmospheric pressure, introducing said pure methanol vapor taken overhead from said dehydrating distillation column at the bottom of said second distillation column, condensing the distilled ester-methanol vapor mixture, separating the ester and liquid methanol from the condensate and recovering a substantially pure dimethyl terephthalate.

2. A process as claimed in claim 1 wherein the methanol content of the initial mixture is from 1.5 to 8 parts by weight for each part by weight of dimethyl terephthalate.

3. A process for the purification of a crude dimethyl terephthalate which comprises: introducing a crude dimethyl terephthalate product containing dimethyl terephthalate, water, methanol and impurities which boil higher and lower than dimethyl terephthalate into a first distillation zone wherein at least a first stage is maintained at a pressure at which the condensation temperature of the vaporized methanol-water mixture is above the solidification temperature of dimethyl terephthalate; withdrawing from said first distillation zone a distillate fraction consisting essentially of methanol, water and impurities which boil lower than dimethyl terephthalate and a residual bottom fraction consisting essentially of the dimethyl terephthalate and impurities which boil higher than dimethyl terephthalate; introducing said residual bottom fraction into a second distillation zone maintained at approximately atmospheric pressure; passing methanol vapor through said second distillation zone for removal therewith of the dimethyl terephthalate in vapor form; condensing the methanol-dimethyl terephthalate vaporous mixture from said second distillation zone; and separating a substantially pure dimethyl terephthalate from the condensate mixture.

4. A process for the purification of a crude dimethyl terephthalate which comprises: introducing a crude dimethyl terephthalate product containing dimethyl terephthalate, water, methanol and impurities which boil higher and lower than dimethyl terephthalate into a first distillation zone wherein at least a first stage is maintained at a pressure at which the condensation temperature of the vaporized methanol-water mixture is above the solidification temperature of dimethyl terephthalate; withdrawing from said first distillation zone a distillate fraction consisting essentially of methanol, water and impurities which boil lower than dimethyl terephthalate and a residual bottom fraction consisting essentially of the dimethyl terephthalate and impurities which boil higher than dimethyl terephthalate; introducing said residual bottom fraction into a second distillation zone maintained at approximately atmospheric pressure; separating substantially pure methanol from said distillate fraction in a third distillation zone and passing the thus separated methanol in vapor form through said second distillation zone for removal therewith of dimethyl terephthalate in vapor form; condensing the methanol-dimethyl terephthalate vaporous mixture from said second distillation zone; and separating a substantially pure dimethyl terephthalate from the condensate mixture.

5. A process as claimed in claim 4 wherein the methanol content of the initial crude mixture is from about 1.5 to 8 parts by weight for each part by weight of dimethyl terephthalate.

6. A process as claimed in claim 5 wherein the water content of the initial crude mixture is between about 1% and 30% by weight with reference to the methanol.

7. A process as claimed in claim 6 wherein the pressure in at least the first stage of said first distillation zone is from 8 to about 20 atmospheres.

8. A process for the purification of a crude dimethyl terephthalate which comprises: introducing a crude dimethyl terephthalate product containing dimethyl terephthalate, water, methanol and impurities which boil higher and lower than dimethyl terephthalate into a first distillation column maintained at a pressure of at least 8 up to about 20 atmospheres; withdrawing a distillate fraction from the top of said first column consisting essentially of methanol and water as a mixed vapor and a residual fraction from the bottom of said first column consisting essentially of the crude dimethyl terephthalate product from which substantially all methanol and water has been removed; introducing the residual fraction from the bottom of said first column into a second distillation column maintained at a pressure of at least 4 atmospheres up to the pressure of said first column; passing the mixed methanol-water vapor from the top of said first column through said second column for removal therewith of impurities having a boiling point lower than that of the dimethyl terephthalate, said methanol, water and impurities being withdrawn as a distillate fraction from the top of said second column; withdrawing a residual fraction from the bottom of said second column consisting essentially of dimethyl terephthalate and impurities which boil higher than dimethyl terephthalate; introducing said residual fraction from the bottom of said second column into a third distillation column maintained at approximately atmospheric pressure; separating substantially pure methanol from the distillate fraction of said second column in a fourth distillation column and passing the thus separated methanol in vapor form through said third distillation column for removal therewith of the dimethyl terephthalate in vapor form; condensing the methanol-dimethyl terephthalate vaporous mixture from said third column; and separating a substantially pure dimethyl terephthalate from the condensate mixture.

9. A process as claimed in claim 8 wherein the initial crude mixture has a methanol content of from 1.5 to 8 parts by weight for each part by weight of dimethyl terephthalate and a water content of between about 1% and 30% by weight with reference to the methanol.

References Cited in the file of this patent

FOREIGN PATENTS

| | | |
|---|---|---|
| 770,797 | Great Britain | Mar. 27, 1957 |
| 203,486 | Australia | May 25, 1959 |